Figure 1:
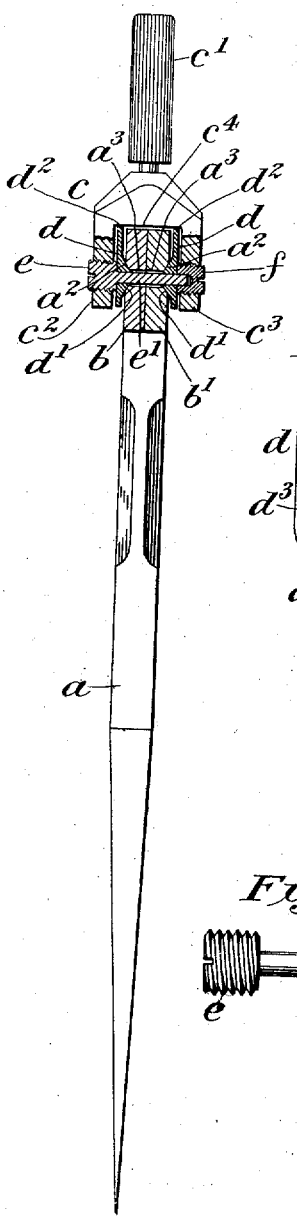

C. D. KING.

PIVOT JOINT.

APPLICATION FILED JULY 2, 1908.

Reissued May 23, 1911.

13,243.

Witnesses:
R. Champion
John A. Jones

Inventor
Charles D. King
By his Attorney
[signature]

THE NORRIS PETERS CO., WASHINGTON, D. C.

UNITED STATES PATENT OFFICE.

CHARLES D. KING, OF BROOKLYN, NEW YORK.

PIVOT-JOINT.

13,243. Specification of Reissued Letters Patent. Reissued May 23, 1911.

Original No. 831,354, dated September 18, 1906, Serial No. 290,104. Application for reissue filed July 2, 1908. Serial No. 441,715.

*To all whom it may concern:*

Be it known that I, CHARLES D. KING, a citizen of the United States, and resident of Brooklyn, in the county of Kings and State of New York, have invented certain new and useful Improvements in Pivot-Joints, of which the following is a specification.

This invention relates to pivot-joints; and its object is to provide joints of this class which will maintain a given adjustment under all conditions of use, which can be more readily adjusted than those heretofore made, which will be less liable to breakage, and which will need a minimum of repairing.

The invention is applicable to a number of articles, but is shown applied to mathematical instruments, such as compasses or dividers; but I do not limit myself to this application of the invention. Pivot-joints as commonly made for such instruments consist of a forked handle containing a pair of screw-pivots bearing in depressions in the upper ends of the legs, and the pivots are kept from turning by small set-screws bearing on the threads of the pivot-screws or by lock-outs. It is obvious that the set-screws do not have a positive hold, will often ruin the threads of the pivots, and also are often broken off and the instruments thereby ruined. The lock-nuts when used are unsatisfactory and imperfect in their action, frequently working loose, and requiring adjustment at inconvenient times.

My invention differs from other pivot-joints known to the art in that the joint is so constructed as to maintain its adjustment under all conditions of use, and will not become loose except as a result of the wearing away of engaging surfaces. To accomplish this it is so constructed that its pivots can not change their relative position lengthwise of their axes, no matter how much or how often the parts pivoted by them may be turned on said pivots when in use. As such a relative movement lengthwise of their axes has heretofore usually resulted from a rotary movement of a threaded adjusting device or other part, in a direction transverse to the axis of the joint, and as I prefer to retain such an adjusting device in the present pivot-joint, the maintenance of the determined adjustment of the joint preferably results from so constructing the joint that there can be no turning movement relative to its support of any part which, if turned, would change its position lengthwise of the axes of the pivots. In my improved pivot-joint the pivots and their adjusting means are best made as separate members so combined that the turning movement of the one can not be transmitted as a turning movement of the other. This result may be obtained by engaging, or otherwise connecting, a pivot and its support so that it will be impossible for turning movement of the parts pivoted to bring about even the slightest relative turning movement between the pivot and its support; and it will be equally impossible for the adjusting means to move even the fraction of a turn relatively to its support. The adjustment resulting from such a construction is very lasting, and obviates the necessity of locking the adjusting means. Because of this, adjustment of the parts may be easily effected, as, for example, by simply giving a slight turn to an adjusting-screw.

Figure 2:
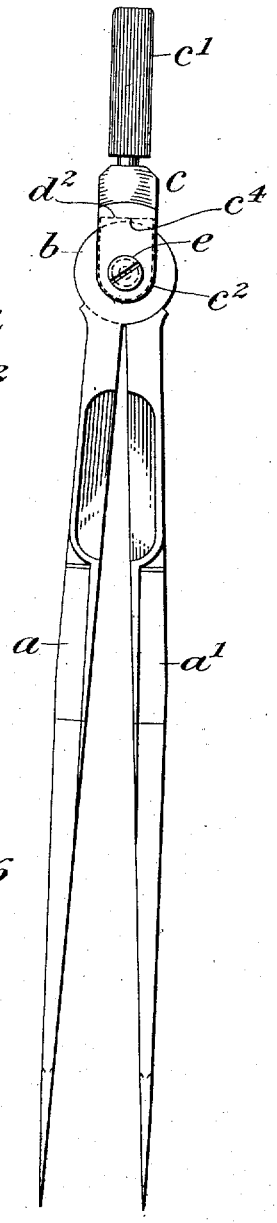
Figure 3:
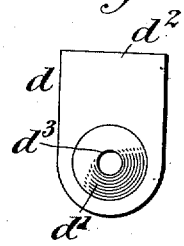
Figure 4:
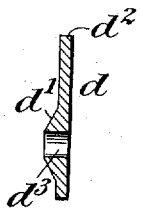
Figure 5:
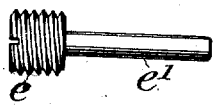
Figure 6:
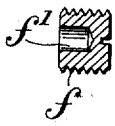

Referring to the drawings, Figure 1 is an enlarged side elevation, partly in section, on the center line of a compass or divider embodying my invention; Fig. 2 is a front elevation of the same; Figs. 3 and 4 are respectively a side elevation and a transverse section of the pivots drawn to a still larger scale; Figs. 5 and 6 are respectively a front elevation and a longitudinal section of the adjusting-screws.

The instrument here illustrated as an embodiment of the invention has the usual divider-legs $a$, $a'$, formed with disk-shaped upper ends $b$, $b'$, and forked supporting means $c$, having a handle $c'$ and projections $c^2$, $c^3$ to support the pivots $d$ and suitable adjusting means.

Referring to Figs. 3 and 4, the pivots are seen to be formed with conical pivoting surfaces $d'$, which bear in conical depressions $a^2$, formed in the ends of the divider-legs. They may also have connected thereto means, such as square-ended lugs or elongations $d^2$, adapted to engage with the upper inside face $c^4$ of the pivot-supporting member $c$, to render the pivots self-locking, and they may have holes $d^3$, which fit the pin or elongation of the screw $e$.

The adjusting means may be short headless screws, $e$ and $f$, of fine pitch, having the usual slots for turning them. The screw $e$ has an elongation $e'$, smaller in diameter than the threaded portion, which fits the holes $d^3$ in the pivots and also passes freely through holes $a^3$ in the divider-legs $a$, $a'$, and enters the hole $f'$ in the screw $f$ when the various parts are assembled. The hole $f'$ extends nearly through the screw $f$, so that a small clearance is left between the end of the pin $e'$ and the end of the hole when both are in place in the instrument, thus allowing for such adjustment as becomes necessary through wear on the pivots.

To assemble the various parts of the instrument, the legs $a$, $a'$ are placed together, while the pivots $d$, $d$, are placed in the depressions $a^2$, the fork $c$ is slipped over them, and the screws $e$ and $f$ are placed in their respective holes in the fork $c$, the pin $e'$ serving to bring the pivots in line with each other and with the other screw $f$, after which the screws are given their final adjustment to bring the pivots against the divider-legs with sufficient pressure to secure easy and accurate working of the instrument. Adjustment is made afterward as the pivoting surfaces wear off by turning one or other of the screws a very slight amount, and they remain positively in such adjustment, as there is nothing to give unintentional turning of the adjusting-screws. For turning the screws a screw-driver or any other suitable means may be employed.

Various other modifications may be devised within the scope of my invention, and I do not limit myself to any particular form.

I claim as my invention:

1. A pivot joint for relatively movable members, comprising a suitable support, pivoting means within said support having integral means for preventing turning, juncture portions on the relatively movable members and also disposed within said support and pivoted by said pivoting means, and means for holding the pivoting means to the support and for adjusting said pivoting means and said juncture portions in position.

2. A pivot joint for relatively movable members, comprising a suitable support, a pivot having integral means for holding it against turning movement, a second pivot, juncture portions of said relatively movable members pivoted by said pivots, and means for holding said first mentioned pivot to the support and for adjusting said pivot and juncture portions in proper position and maintaining such adjustment.

3. A pivot joint for relatively movable members, comprising a forked support, pivotal portions of said relatively movable members projecting into the fork, pivots on the outer sides of said pivotal portions within said fork, means for preventing turning of said pivots said means embodying stops having stop-faces each of which is disposed transversely to an arc struck from the axis of its pivot, and means for holding said pivots in their respective positions in the support and for adjusting them and said pivotal portions.

4. A pivot compass joint, comprising a yoke, pivots carried therein, means for preventing turning of said pivots said means embodying stops having engaging stop-faces each of which is disposed transversely to an arc struck from the axis of its pivot, pivotal portions of compass legs pivoted by said pivots, and means for alining and adjusting the pivots and pivotal portions of the legs and for holding the pivots in place on the yoke.

5. A pivot compass joint comprising a forked support, pivots carried therein having lugs engaging with said support to prevent rotation of the pivots, pivotal portions of compass legs pivoted by said pivots, screws for adjusting said pivots, and a central member for alining the pivots on the support.

6. A pivot joint, comprising supporting means, two parts to be pivoted, a pair of pivots carried by said supporting means and carrying said parts to be pivoted, and means for positively maintaining said pivots at an exact predetermined distance apart in the direction of their axes, said means embodying stops having engaging stop-faces disposed transversely to an arc struck from one of said axes.

7. A pivot joint, comprising supporting means, two parts to be pivoted, a pair of pivots carried by said supporting means and carrying said parts to be pivoted, means separate from one of said pivots for maintaining a fine adjustment of such pivot in the direction of the axis of that pivot, and means for positively maintaining a fixed relation between said pivot and its support circumferentially of said axis, said means embodying stops having engaging stop-faces disposed transversely to an arc struck from the axis of said pivot and carried respectively by said pivot and its support.

8. A pivot joint, comprising supporting means, two parts to be pivoted, a pair of pivots carried by said supporting means and carrying said parts to be pivoted, means for adjusting one of said pivots in the direction of its own axis, and connecting means between said pivot and its support for preventing relative movement of said parts circumferentially of said axis said means embodying stops having engaging stop-faces disposed transversely to an arc struck from the axis of said pivot and carried respectively by said pivot and its support.

9. A pivot joint, comprising supporting means, two parts to be pivoted, a pair of pivots carried by said supporting means and carrying said parts to be pivoted, means for adjusting one of said pivots in the direction of its own axis, and means for positively maintaining a fixed relation between said pivots circumferentially of said axis said means embodying stops having engaging stop-faces disposed transversely to an arc struck from the axis of said pivots and carried respectively by said pivots and their supporting means.

10. A pivot joint, comprising supporting means, two parts to be pivoted, a pair of pivots carried by said supporting means and carrying said parts to be pivoted, and means for positively maintaining a fixed relation of said pivots both lengthwise and circumferentially of their axes throughout all turning movements of the parts which they pivot said means embodying stops having engaging stop-faces disposed transversely to an arc struck from the axis of one of said pivots.

11. A pivot joint, comprising supporting means, two parts to be pivoted, a pair of pivots carried by said supporting means and carrying said parts to be pivoted, means for obtaining a fine adjustment of said pivots relative to each other, said means embodying a rotary pivot stop having means for converting its turning movement into a movement lengthwise of the axes of the pivots, and means for preventing circumferential movements of said pivot-stop relative to its support by said parts to be pivoted said means embodying stops having engaging stop-faces disposed transversely to an arc struck from the axis of the pivot with which said pivot-stop coacts and carried respectively by said pivot and its support.

12. A pivot joint, comprising supporting means, two parts to be pivoted, a pair of pivots carried by said supporting means and carrying said parts to be pivoted, and means for positively maintaining a fixed relation of said pivots both lengthwise and circumferentially of their axis throughout all turning movements of the parts which they pivot said means embodying stops having engaging stop-faces disposed transversely to an arc struck from the axis of one of said pivots and also embodying adjusting means independent of said stop-faces.

Signed at New York, in the county of New York, and State of New York, this 29th day of June, 1908.

CHARLES D. KING.

Witnesses:

C. S. CHAMPION,

R. CHAMPION.

Copies of this patent may be obtained for five cents each, by addressing the "Commissioner of Patents, Washington, D. C."